United States Patent
Guo et al.

(10) Patent No.: US 10,979,191 B2
(45) Date of Patent: Apr. 13, 2021

(54) METHOD AND APPARATUS FOR REFERENCE SIGNAL SIGNALING FOR ADVANCED WIRELESS COMMUNICATIONS

(71) Applicant: Samsung Electronics Co., Ltd, Suwon-si (KR)

(72) Inventors: Li Guo, Allen, TX (US); Young-Han Nam, Plano, TX (US); Boon Loong Ng, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/617,922

(22) Filed: Jun. 8, 2017

(65) Prior Publication Data

US 2018/0041321 A1   Feb. 8, 2018

Related U.S. Application Data

(60) Provisional application No. 62/371,679, filed on Aug. 5, 2016.

(51) Int. Cl.
*H04L 5/00* (2006.01)
*H04W 72/12* (2009.01)
(Continued)

(52) U.S. Cl.
CPC .......... *H04L 5/0051* (2013.01); *H04L 5/0048* (2013.01); *H04L 5/0053* (2013.01);
(Continued)

(58) Field of Classification Search
None
See application file for complete search history.

(56) References Cited

U.S. PATENT DOCUMENTS

| 2003/0031241 A1 | 2/2003 | Mar et al. | |
| 2012/0120903 A1* | 5/2012 | Kim | H04B 7/024 370/329 |

(Continued)

FOREIGN PATENT DOCUMENTS

| WO | 2016000915 A1 | 1/2016 |
| WO | 2017176602 A1 | 10/2017 |
| WO | 2018062942 A1 | 4/2018 |

OTHER PUBLICATIONS

International Search Report and Written Opinion for International Application No. PCT/KR2017/008413, dated Nov. 17, 2017. (9 pages).

(Continued)

*Primary Examiner* — Ruihua Zhang

(57) ABSTRACT

A method of a user equipment (UE) for configuring a phase noise reference signal (RS) in an advanced communication system. The method comprises receiving, from a base station (BS), configuration information of the phase noise RS using a radio resource control (RRC) signal and downlink control information (DCI) through a hybrid signaling scheme including information of the phase noise RS; identifying an RS mapping pattern based on the configuration information of the phase noise RS signaled in the RRC and DCI through the hybrid signaling scheme; performing a channel estimation and phase tracking for a downlink channel in a scheduled bandwidth (BW) according to the identified RS mapping pattern; and receiving, from the BS, downlink data over the downlink channel in the scheduled BW.

25 Claims, 11 Drawing Sheets

(51) Int. Cl.
  *H04W 72/08* (2009.01)
  *H04W 72/04* (2009.01)
  *H04L 25/02* (2006.01)
  *H04B 7/0413* (2017.01)

(52) U.S. Cl.
  CPC ......... *H04L 5/0094* (2013.01); *H04W 72/042* (2013.01); *H04W 72/082* (2013.01); *H04W 72/1268* (2013.01); *H04W 72/1273* (2013.01); *H04B 7/0413* (2013.01); *H04L 25/022* (2013.01)

(56) References Cited

U.S. PATENT DOCUMENTS

| | | | |
|---|---|---|---|
| 2014/0133395 A1* | 5/2014 | Nam | H04B 7/0452 370/328 |
| 2014/0204853 A1 | 7/2014 | Ko et al. | |
| 2015/0063283 A1 | 3/2015 | Shi et al. | |
| 2015/0282123 A1 | 10/2015 | Miao et al. | |
| 2015/0358132 A1 | 12/2015 | Wallen et al. | |
| 2016/0087708 A1* | 3/2016 | Kang | H04B 7/0619 370/312 |
| 2016/0277954 A1* | 9/2016 | Frenne | H04W 72/0413 |
| 2016/0330011 A1* | 11/2016 | Lee | H04L 5/0066 |
| 2016/0366659 A1* | 12/2016 | Yang | H04W 56/0035 |
| 2017/0141875 A1* | 5/2017 | Eliaz | H04L 1/0006 |
| 2017/0180029 A1* | 6/2017 | Chen | H04B 7/0469 |
| 2017/0188371 A1* | 6/2017 | Kim | H04W 24/10 |
| 2017/0250781 A1* | 8/2017 | Golitschek Edler Von Elbwart | H04L 5/005 |
| 2017/0294926 A1* | 10/2017 | Islam | H04B 17/336 |
| 2017/0302352 A1* | 10/2017 | Islam | H04B 7/0626 |
| 2020/0008228 A1* | 1/2020 | Lee | H04L 5/001 |

OTHER PUBLICATIONS

Cisco, et al., "Verizon 5G TF; Air Interface Working Group; Verizon 5th Generation Radio Access; Physical channels and modulation (Release 1)", TS V5G.211 V1.3, Jun. 29, 2016 (URL: http://www.5gtf.net/V5G_211_v1p7.pdf). (79 pages).

ETSI TS 136 211 v13.0.0 (Jan. 2016) Technical Specification LTE; Evolved Universal Terrestrial Radio Access (E-UTRA); Physical channels and modulation (3GPP TS 3621 version 13.0.0 Release 13) 143 Pages.

ETSI TS 136 212 v13.0.0(Jan. 2016) Technical Specification LTE; Evolved Universal Terrestrial Radio Access (E-UTRA); Multiplexing and channel coding (3GPP TS 36.212 version 13.0.0 Release 13) 123 Pages.

ETSI TS 136 213 v13.0.0(May 2016) Technical Specification LTE; Evolved Universal Terrestrial Radio Access (E-UTRA); Physical layer procedures (3GPP TS 36.213 version 13.0.0 Release 13) 328 Pages.

ETSI TS 136 331 v13.0.0(Jan. 2016) Technical Specification LTE; Evolved Universal Terrestrial Radio Access (E-UTRA); Radio Resource Control (RRC); Protocol specification (3GPP TS 36.331 version 13.0.0 Release 13)—670.

Extended European Search Report dated Jul. 29, 2019 regarding Application No. 17837271.0, 10 pages.

Intel Corporation, "On PT-RS for CP-OFDM", 3GPP TSG-RAN WG1 #89, R1-1707366, May 2017, 8 pages.

Communication pursuant to Article 94(3) EPC in connection with European Application No. 17837271.0 dated Aug. 10, 2020, 5 pages.

European Patent Office, Communication pursuant to Article 94(3) EPC regarding Application No. 17837271.0, dated Feb. 22, 2021, 7 pages.

\* cited by examiner

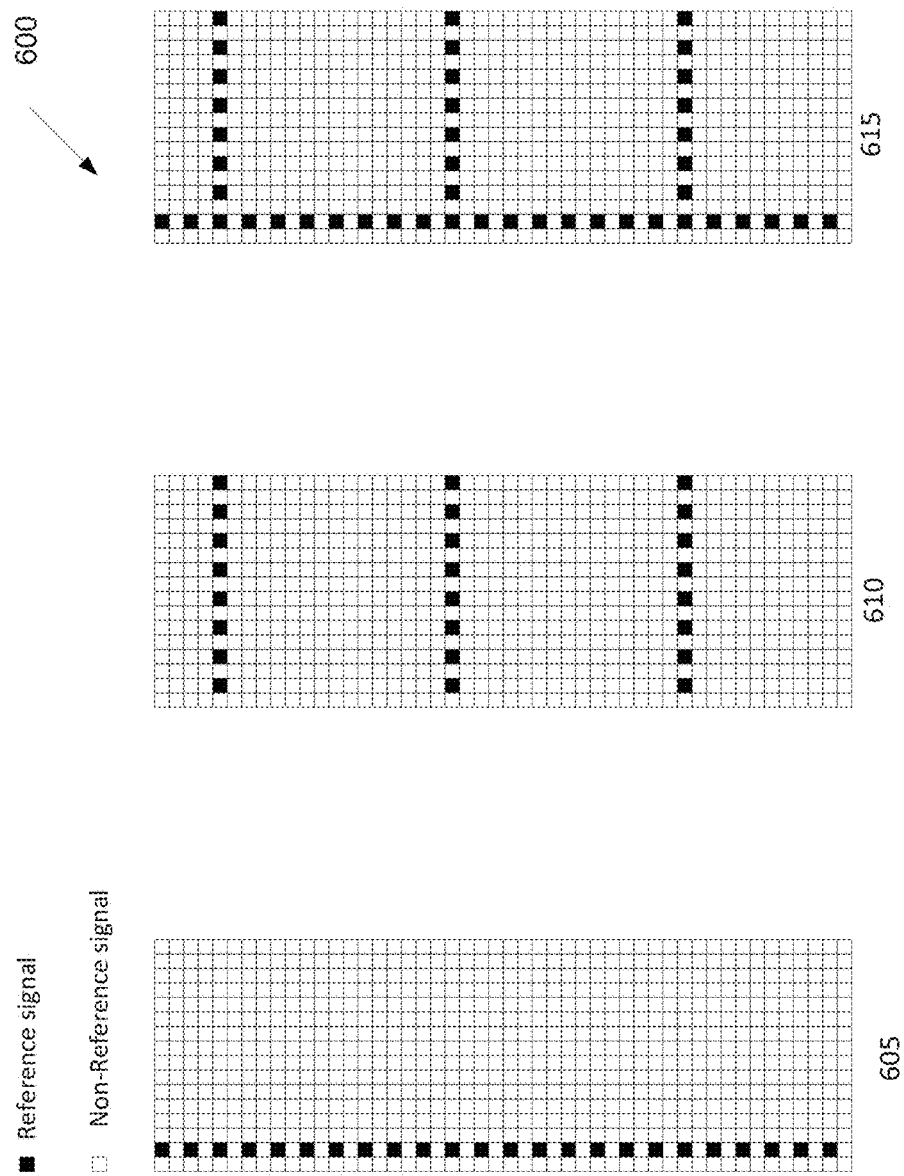

METHOD AND APPARATUS FOR REFERENCE SIGNAL SIGNALING FOR ADVANCED WIRELESS COMMUNICATIONS

CROSS-REFERENCE TO RELATED APPLICATIONS AND CLAIM OF PRIORITY

The present application claims priority to U.S. Provisional Patent Application Ser. No. 62/371,679, filed on Aug. 5, 2016, entitled "Method and Apparatus for reference signal signaling for advanced wireless communications." The content of the above-identified patent document is incorporated herein by reference.

TECHNICAL FIELD

The present application relates generally to reference signal signaling in advanced wireless communications. More specifically, this disclosure relates to a reference signal design for transmission in a physical downlink channel for data transmissions analogous to physical downlink shared channel (PDSCH) in LTE.

BACKGROUND

A reference signal (RS) can be provided for facilitating demodulation on an antenna port. In orthogonal frequency division multiplexing (OFDM) systems, the reference signal is mapped onto a NRSREs number of resource elements (REs) in a time-frequency resource unit. RS's for multiple antenna ports can be orthogonally multiplexed time division multiplexing (TDM), frequency division multiplexing (FDM), code division multiplexing (CDM) or with a combination of a few of these multiplexing methods. When a CDM is applied, different orthogonal cover codes (OCCs) can be assigned for different antenna ports.

SUMMARY

The present disclosure relates to a pre-$5^{th}$-Generation (5G) or 5G communication system to be provided for supporting higher data rates beyond $4^{th}$-Generation (4G) communication system such as long term evolution (LTE). Embodiments of the present disclosure provide advanced channel state information (CSI) reporting based on linear combination codebook for multi-input multi-output (MIMO) wireless communication systems wherein advanced CSI comprises at least one of a downlink channel matrix, a covariance matrix of the downlink channel matrix, or at least one eigenvector of the covariance matrix of the downlink channel matrix.

In one embodiment, a user equipment (UE) for configuring a phase noise reference signal (RS) in an advanced communication system is provided. The UE comprises a transceiver configured to receive, from a base station (BS), configuration information of the phase noise RS using a radio resource control (RRC) signal and downlink control information (DCI) through a hybrid signaling scheme. The UE further comprises at least one processor configured to identify an RS mapping pattern based on the configuration information of the phase noise RS signaled in the RRC and the DCI through the hybrid signaling scheme and perform a channel estimation and phase tracking for a downlink channel in a scheduled bandwidth (BW) according to the identified RS mapping pattern. The transceiver is further configured to receive, from the BS, downlink data over the downlink channel in the scheduled BW.

In another embodiment, a base station (BS) for configuring a phase noise reference signal (RS) in an advanced communication system is provided. The BS comprises at least one processor configure to generate information of the phase noise RS including an RS mapping pattern, wherein the RS mapping pattern is used, at a user equipment (UE), for a channel estimation and phase tracking for a downlink channel in a scheduled bandwidth (BW). The BS further comprises a transceiver configured to transmit the information of the phase noise RS, to a user equipment (UE), using a radio resource control (RRC) signal and downlink control information (DCI) through a hybrid signaling scheme, transmit, to the UE, downlink data over a downlink channel in the scheduled BW, and receive, from the UE, uplink data over an uplink channel in the scheduled BW.

In yet another embodiment, a method of a user equipment (UE) for configuring a phase noise reference signal (RS) in an advanced communication system is provided. The method comprises receiving, from a base station (BS), configuration information of the phase noise RS using a radio resource control (RRC) signal and downlink control information (DCI) through a hybrid signaling scheme including information of the phase noise RS, identifying an RS mapping pattern based on the configuration information of the phase noise RS signaled in the RRC and DCI through the hybrid signaling scheme, performing a channel estimation and phase tracking for a downlink channel in a scheduled bandwidth (BW) according to the identified RS mapping pattern; and receiving, from the BS, downlink data over the downlink channel in the scheduled BW.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

Aspects, features, and advantages of the present disclosure are readily apparent from the following detailed description, simply by illustrating a number of particular embodiments and implementations, including the best mode contemplated for carrying out the present disclosure. The present disclosure is also capable of other and different embodiments, and its several details can be modified in various obvious respects, all without departing from the spirit and scope of the present disclosure. Accordingly, the drawings and description are to be regarded as illustrative in nature, and not as restrictive. The present disclosure is illustrated by way of example, and not by way of limitation, in the figures of the accompanying drawings.

In the following, for brevity, both FDD and TDD are considered as the duplex method for both DL and UL signaling.

Although exemplary descriptions and embodiments to follow assume orthogonal frequency division multiplexing (OFDM) or orthogonal frequency division multiple access (OFDMA), this present disclosure can be extended to other OFDM-based transmission waveforms or multiple access schemes such as filtered OFDM (F-OFDM).

This present disclosure covers several components which can be used in conjunction or in combination with one another, or can operate as standalone schemes

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 6 illustrates example reference signal (RS) patterns according to embodiments of the present disclosure;

DETAILED DESCRIPTION

FIGS. 1 through FIG. 10, discussed below, and the various embodiments used to describe the principles of the present disclosure in this patent document are by way of illustration only and should not be construed in any way to limit the scope of the disclosure. Those skilled in the art may understand that the principles of the present disclosure may be implemented in any suitably arranged system or device.

The following documents and standards descriptions are hereby incorporated by reference into the present disclosure as if fully set forth herein: 3GPP TS 36.211 v13.0.0, "E-UTRA, Physical channels and modulation" (REF1); 3GPP TS 36.212 v13.0.0, "E-UTRA, Multiplexing and Channel coding" (REF2); 3GPP TS 36.213 v13.0.0, "E-UTRA, Physical Layer Procedures" (REF3); and 3GPP TS 36.331 v13.0.0, "Radio Resource Control (RRC) Protocol Specification" (REF4).

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 1:
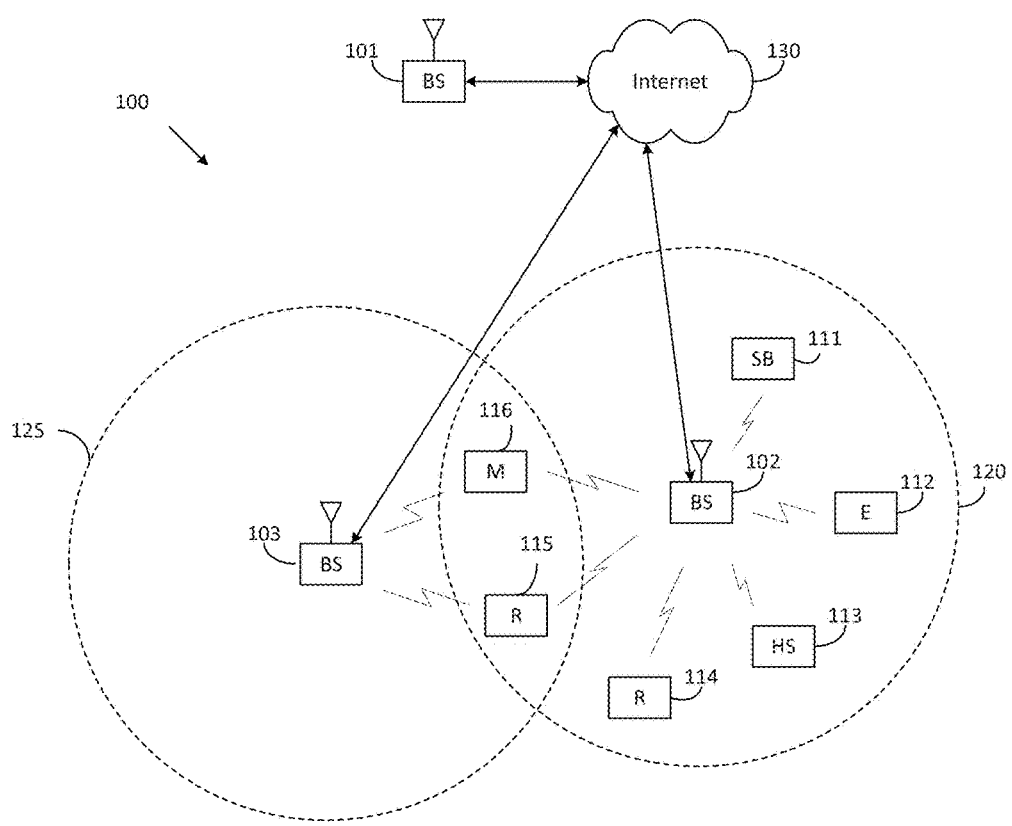
FIG. 1 illustrates an example wireless network according to embodiments of the present disclosure.
Figure 2:
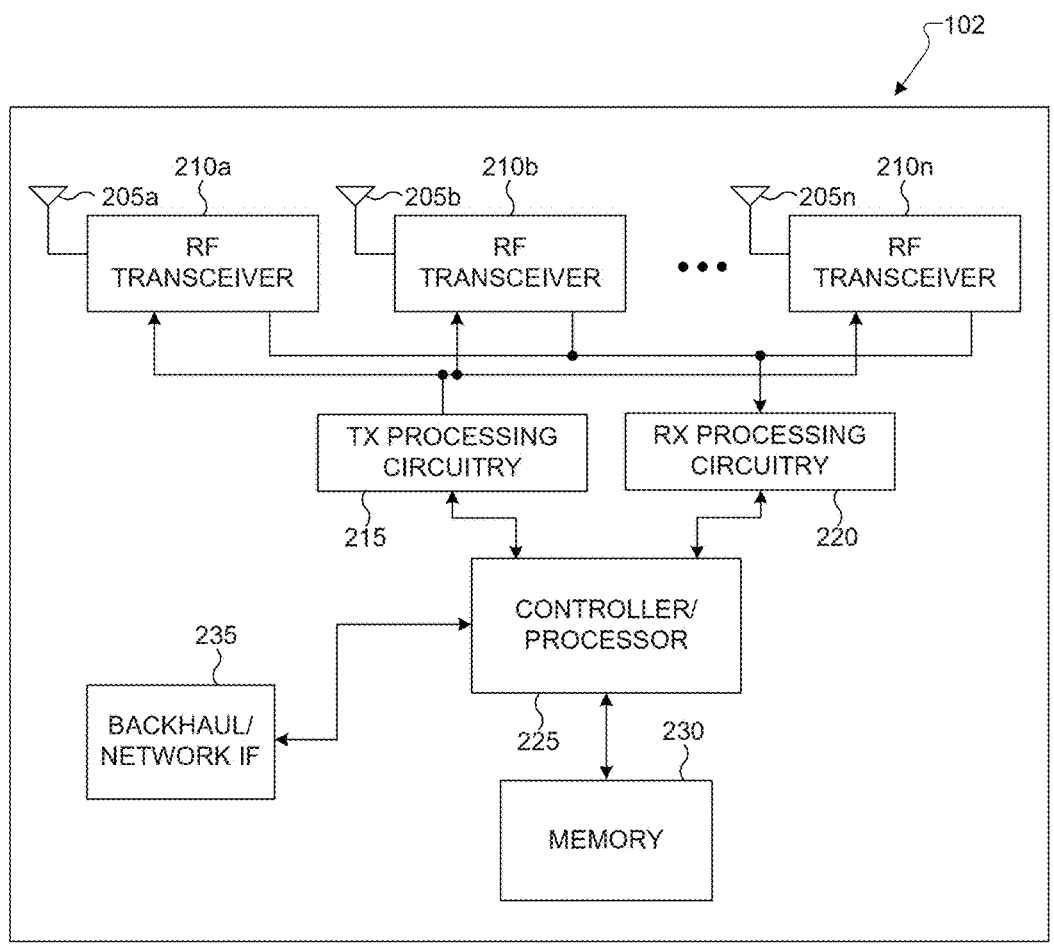
FIG. 2 illustrates an example eNodeB (eNB) according to embodiments of the present disclosure.
Figure 3:
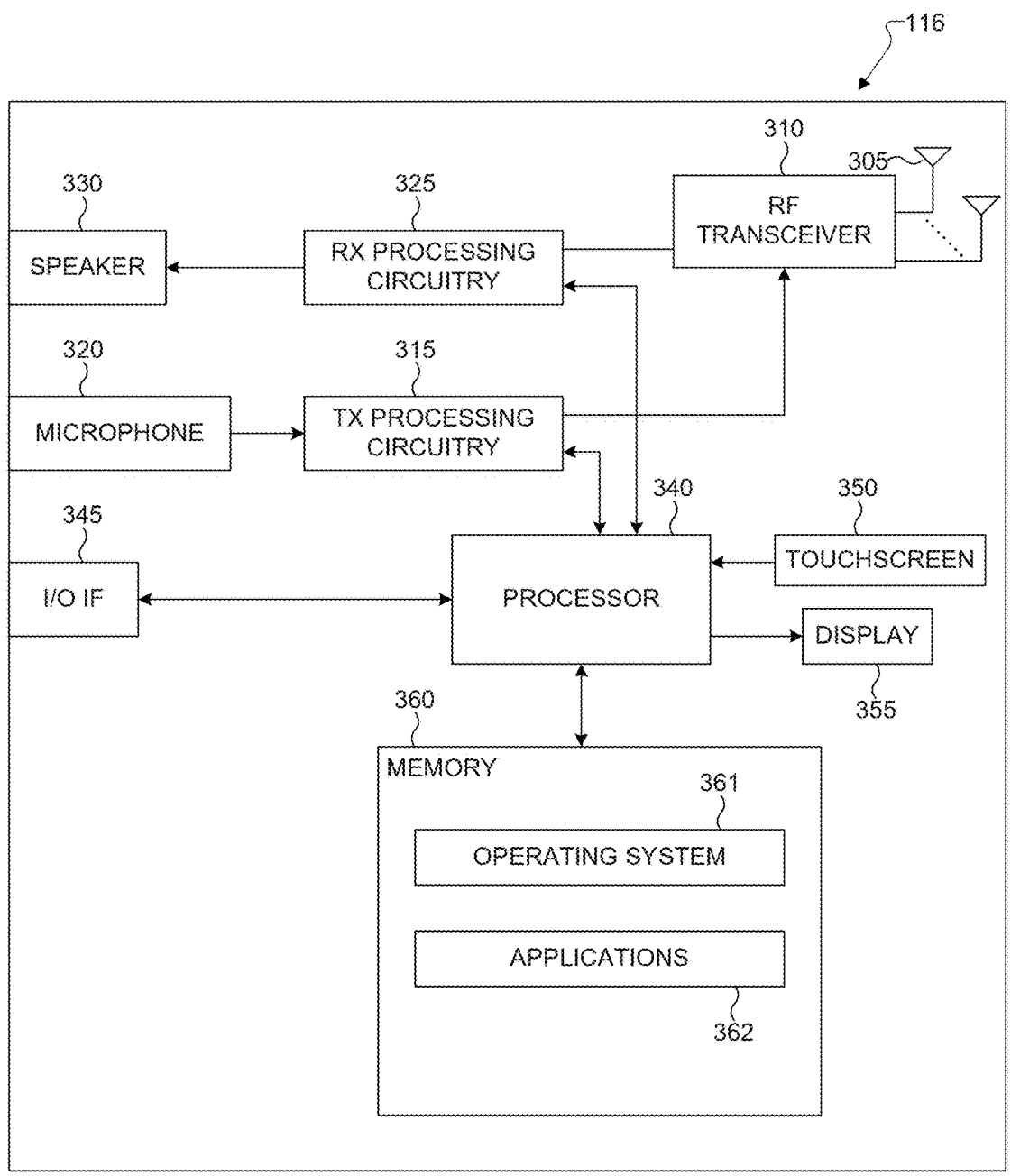
FIG. 3 illustrates an example user equipment (UE) according to embodiments of the present disclosure.

FIGS. 1-4B below describe various embodiments implemented in wireless communications systems and with the use of OFDM or OFDMA communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), gNB, a macrocell, a femtocell, a WiFi access point (AP), or other wirelessly enabled devices. Base stations may provide wireless access in accordance with one or more wireless communication protocols, e.g., 5G 3GPP New Radio Interface/Access (NR), long term evolution (LTE), LTE advanced (LTE-A), High Speed Packet Access (HSPA), Wi-Fi 802.11a/b/g/n/ac, etc. For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programing, or a combination thereof, for efficient CSI reporting on an uplink channel in an advanced wireless communication system. In certain embodiments, and one or more of the eNBs 101-103 includes circuitry, programing, or a combination thereof, for receiving efficient CSI reporting on an uplink channel in an advanced wireless communication system.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

FIG. 2 illustrates an example eNB 102 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

In some embodiment, the RF transceivers 210a-210n is capable of transmitting the information of the phase noise RS, to a user equipment (UE), using a radio resource control (RRC) signal and downlink control information (DCI) through a hybrid signaling scheme, transmitting, to the UE, downlink data over a downlink channel in the scheduled BW, and receiving, from the UE, uplink data over an uplink channel in the scheduled BW.

In such embodiments, the RRC signal includes information indicating whether the phase noise RS for the phase tracking is included for the downlink channel and the uplink channel in the scheduled BW, respectively.

In such embodiments, the DCI includes a modulation and coding scheme to identify the RS mapping pattern when the phase noise RS for the phase tracking is included for a scheduled downlink allocation and a scheduled uplink allocation in the scheduled BW, respectively.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225.

In some embodiments, the controller/processor 225 includes at least one microprocessor or microcontroller. As described in more detail below, the eNB 102 may include circuitry, programing, or a combination thereof for processing of reference signal on a downlink channel. For example, controller/processor 225 can be configured to execute one or more instructions, stored in memory 230, that are configured to cause the controller/processor to process the reference signal.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The controller/processor 225 is capable of generating information of the phase noise RS including an RS mapping pattern, wherein the RS mapping pattern is used, at a user equipment (UE), for a channel estimation and phase tracking for a downlink channel in a scheduled bandwidth (BW).

In such embodiments, an RRC signal includes information indicating whether the phase noise RS for the phase tracking is included for the downlink channel and the uplink channel in the scheduled BW, respectively.

In such embodiments, a DCI includes a modulation and coding scheme to identify the RS mapping pattern when the phase noise RS for the phase tracking is included for a scheduled downlink allocation and a scheduled uplink allocation in the scheduled BW, respectively.

In such embodiments, the DCI comprises a code point indicating whether a scheduled downlink allocation and a scheduled uplink allocation in the scheduled BW includes the phase noise RS, respectively and a code point indicating at least one density pattern that is used for a scheduled downlink allocation and a scheduled uplink allocation included in the scheduled BW.

In such embodiments, demodulation reference signal (DMRS) antenna ports corresponding to phase noise RS antenna ports, a phase rotation estimated from the phase noise RS is applied to a channel that is estimated from the DMRS antenna ports, and a number of phase tracking RS antenna ports is less than a number of the DMRS antenna ports in the scheduled BW.

The controller/processor 225 is capable of identifying demodulation reference signal (DMRS) antenna ports corresponding to phase noise RS antenna ports, wherein a phase rotation estimated from the phase noise RS is applied to a channel that is estimated from the DMRS antenna ports.

In such embodiments, a number of phase tracking RS antenna ports is less than a number of the DMRS antenna ports in the scheduled BW.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

In some embodiments, the RF transceiver 310 is capable of receiving, from a base station (BS), configuration information of the phase noise RS using a radio resource control (RRC) signal and downlink control information (DCI) through a hybrid signaling scheme and receiving, from the BS, downlink data over the downlink channel in the scheduled BW.

In some embodiments, the RF transceiver 310 is capable of transmitting, to the BS, uplink data over the uplink channel in the scheduled BW.

In such embodiments, the RRC signal includes information indicating whether the phase noise RS for the phase tracking is included for the downlink channel and an uplink channel in the scheduled BW, respectively.

In such embodiments, the DCI includes a modulation and coding scheme to identify whether the phase noise RS is included in a scheduled downlink allocation or a scheduled uplink allocation, and the RS mapping pattern when the phase noise RS for the phase tracking is included in the scheduled downlink allocation and the scheduled uplink allocation over the scheduled BW, respectively.

In such embodiments, the DCI comprises a code point indicating whether a scheduled downlink allocation and a scheduled uplink allocation in the scheduled BW includes the phase noise RS, respectively.

In such embodiments, the DCI comprises a code point indicating at least one frequency and time density pattern that is used for a scheduled downlink allocation and a scheduled uplink allocation included in the scheduled BW.

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for reference signal on a downlink channel. The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

In some embodiments, the processor 340 is also capable of identifying an RS mapping pattern based on the configuration information of the phase noise RS signaled in the RRC and the DCI through the hybrid signaling scheme, and performing a channel estimation and phase tracking for a downlink channel in a scheduled bandwidth (BW) according to the identified RS mapping pattern.

In some embodiments, the processor 340 is also capable of performing the channel estimation and phase tracking for an uplink channel in the scheduled BW according to the identified RS mapping pattern.

In such embodiments, the RRC signal includes information indicating whether the phase noise RS for the phase tracking is included for the downlink channel and an uplink channel in the scheduled BW, respectively.

In such embodiments, the DCI includes a modulation and coding scheme to identify whether the phase noise RS is included in a scheduled downlink allocation or a scheduled uplink allocation, and the RS mapping pattern when the phase noise RS for the phase tracking is included in the scheduled downlink allocation and the scheduled uplink allocation over the scheduled BW, respectively.

In such embodiments, the DCI comprises a code point indicating whether a scheduled downlink allocation and a scheduled uplink allocation in the scheduled BW includes the phase noise RS, respectively.

In such embodiments, the DCI comprises a code point indicating at least one frequency and time density pattern that is used for a scheduled downlink allocation and a scheduled uplink allocation included in the scheduled BW.

In some embodiments, the processor 340 is also capable of identifying demodulation reference signal (DMRS) antenna ports corresponding to phase noise RS antenna ports and applying, to a channel, a phase rotation estimated from the phase noise RS, wherein the channel is estimated from the DMRS antenna ports.

In such embodiments, a number of phase tracking RS antenna ports is less than a number of the DMRS antenna ports in the scheduled BW.

identifying an RS mapping pattern based on the information of the phase noise RS and performing a channel estimation and phase tracking for a downlink channel in a scheduled bandwidth (BW) according to the identified RS mapping pattern, wherein the transceiver is further configured to receive, from the BS, downlink data over the downlink channel in the scheduled BW.

In some embodiments, the processor 340 is also capable of performing the channel estimation and phase tracking for an uplink channel in the scheduled BW according to the identified RS mapping pattern.

In such embodiments, the RRC signal includes information indicating whether the phase noise RS for the phase tracking is included for the downlink channel and an uplink channel in the scheduled BW, respectively.

In such embodiments, the DCI includes a modulation and coding scheme to identify the RS mapping pattern when the phase noise RS for the phase tracking is included for the downlink channel and an uplink channel in the scheduled BW, respectively.

In such embodiments, the DCI comprises a code point indicating whether the downlink channel and an uplink channel in the scheduled BW includes the phase noise RS, respectively.

In such embodiments, the DCI comprises a code point indicating at least one density pattern that is used for the downlink channel and an uplink channel included in the scheduled BW.

In some embodiments, the processor 340 is also capable of identifying demodulation reference signal (DMRS) antenna ports corresponding to phase noise RS antenna ports and applying, to a channel, a phase rotation estimated from the phase noise RS, wherein the channel is estimated from the DMRS antenna ports.

In such embodiments, a number of phase tracking RS antenna ports is less than a number of the DMRS antenna ports in the scheduled BW.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
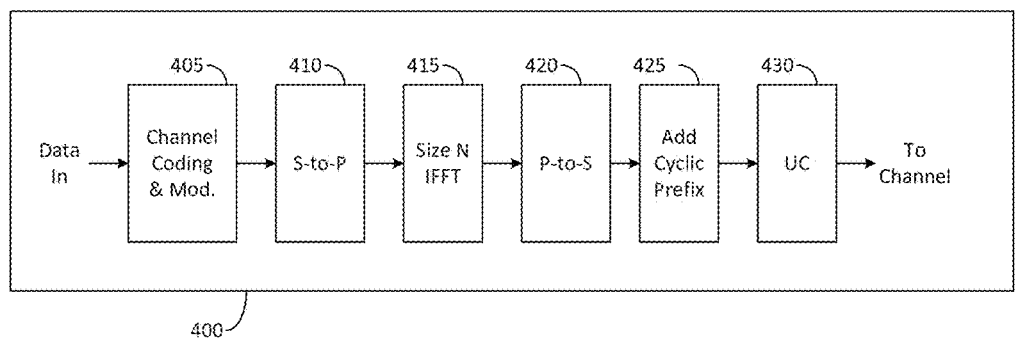
FIG. 4A illustrates a high-level diagram of an orthogonal frequency division multiple access transmit path according to embodiments of the present disclosure.
Figure 4B:
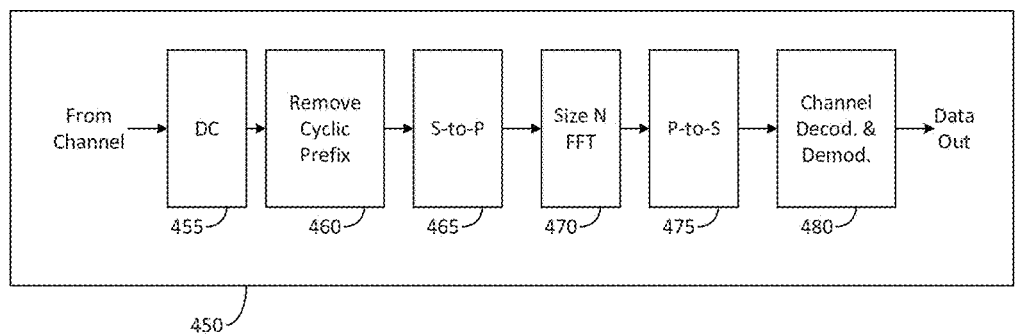
FIG. 4B illustrates a high-level diagram of an orthogonal frequency division multiple access receive path according to embodiments of the present disclosure.

FIG. 4A is a high-level diagram of transmit path circuitry 400. For example, the transmit path circuitry 400 may be used for an orthogonal frequency division multiple access (OFDMA) communication. FIG. 4B is a high-level diagram of receive path circuitry 450. For example, the receive path circuitry 450 may be used for an orthogonal frequency division multiple access (OFDMA) communication. In FIGS. 4A and 4B, for downlink communication, the transmit path circuitry 400 may be implemented in a base station (eNB) 102 or a relay station, and the receive path circuitry 450 may be implemented in a user equipment (e.g. user equipment 116 of FIG. 1). In other examples, for uplink communication, the receive path circuitry 450 may be implemented in a base station (e.g. eNB 102 of FIG. 1) or a relay station, and the transmit path circuitry 400 may be implemented in a user equipment (e.g. user equipment 116 of FIG. 1).

Transmit path circuitry 400 comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A and 4B may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It may be appreciated that in an alternate embodiment of the disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at eNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of eNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to eNBs 101-103 and may implement a receive path corresponding to the architecture for receiving in the downlink from eNBs 101-103.

Figure 5:
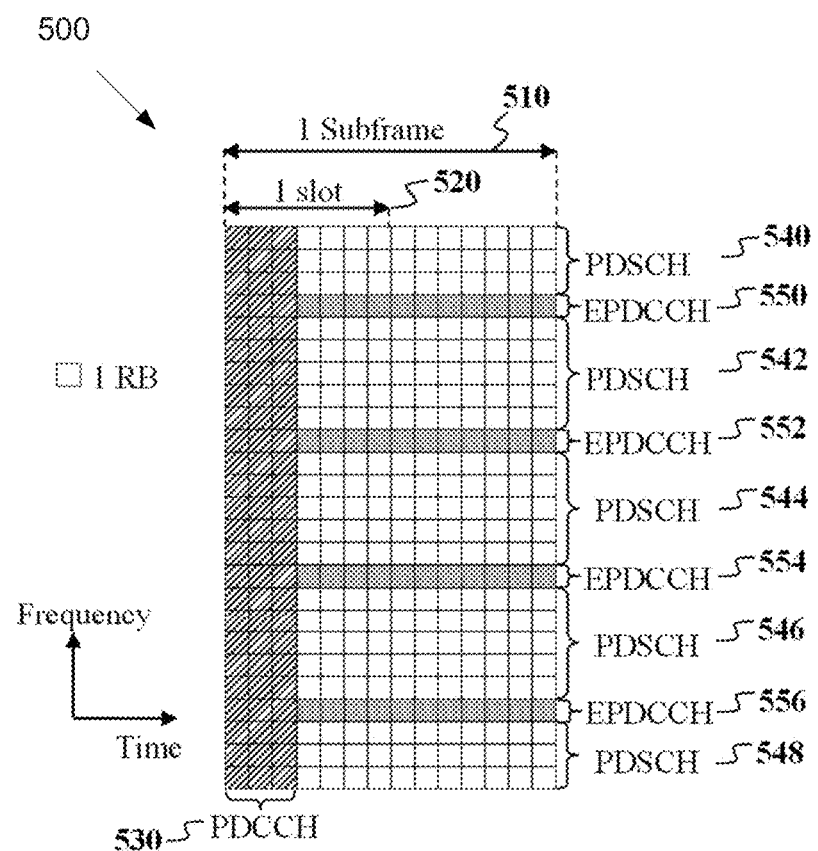
FIG. 5 illustrates an example structure for a downlink (DL) subframe according to embodiments of the present disclosure.

FIG. 5 illustrates an example structure for a DL subframe 500 according to embodiments of the present disclosure. An embodiment of the DL subframe structure 500 shown in FIG. 1 is for illustration only. Other embodiments may be used without departing from the scope of the present disclosure. The downlink subframe (DL SF) 510 includes two slots 520 and a total of $N_{symb}^{DL}$ symbols for transmitting of data information and downlink control information (DCI). The first $M_{symb}^{DL}$ SF symbols are used to transmit PDCCHs and other control channels 530 (not shown in FIG. 5). The remaining Z SF symbols are primarily used to transmit physical downlink shared channels (PDSCHs) 540, 542, 544, 546, and 548 or enhanced physical downlink control channels (EPDCCHs) 550, 552, 554, and 556. A transmission bandwidth (BW) comprises frequency resource units referred to as resource blocks (RBs). Each RB comprises either $N_{sc}^{RB}$ sub-carriers or resource elements (REs) (such as 12 REs). A unit of one RB over one subframe is referred to as a physical RB (PRB). A UE is allocated to $M_{PDSCH}$ RBs for a total of $Z=O_F+\lfloor (n_{so}+y \cdot N_{EPDCCH})/D \rfloor$ REs for a PDSCH transmission BW. An EPDCCH transmission is achieved in either one RB or multiple of RBs.

A reference signal (RS) can be provided for facilitating demodulation on an antenna port. In OFDM systems, the reference signal is mapped onto a NRSREs number of resource elements (REs) in a time-frequency resource unit. RS's for multiple antenna ports can be orthogonally multiplexed TDM, FDM, CDM or with a combination of a few of these multiplexing methods. When the CDM is applied, different orthogonal cover codes (OCCs) can be assigned for different antenna ports. In the present disclosure, an RS mapping pattern for an antenna port describes: (1) the time frequency locations of NRSREs number of RSREs; and (2) OCCs if CDM is applied.

In one embodiment, a UE is configured to use either a first RS mapping pattern, or an aggregation of the first and a second RS mapping patterns, for PDSCH demodulation on each antenna port, wherein, the first RS mapping pattern comprises a first set of RSREs (dense in frequency) that enables the UE to estimate the channel response and to take the estimates as demodulation reference, and the second RS mapping pattern includes a second set of RSREs (dense in time) that enable the UE estimate the phase error caused by phase noise.

FIG. 6 illustrates example reference signal (RS) patterns 600 according to embodiments of the present disclosure. An embodiment of the RS patterns 600 shown in FIG. 6 is for illustration only. Other embodiments may be used without departing from the scope of the present disclosure. As shown in FIG. 6, an RS pattern 605 shows an example of the first RS mapping pattern which is dense in frequency domain to enable the UE to estimate the channels. An RS pattern 610 in FIG. 6 shows an example of the second RS mapping pattern, which is dense in time domain to enable the UE to estimate the phase variation along time. An RS pattern 615 shows an example for an aggregation of the first and the second RS mapping patterns (e.g., RS pattern 605 and 610, respectively), which has both time domain and frequency domain samples that enable UE to estimate channel in frequency domain and also track the phase variation along time.

Figure 7A:
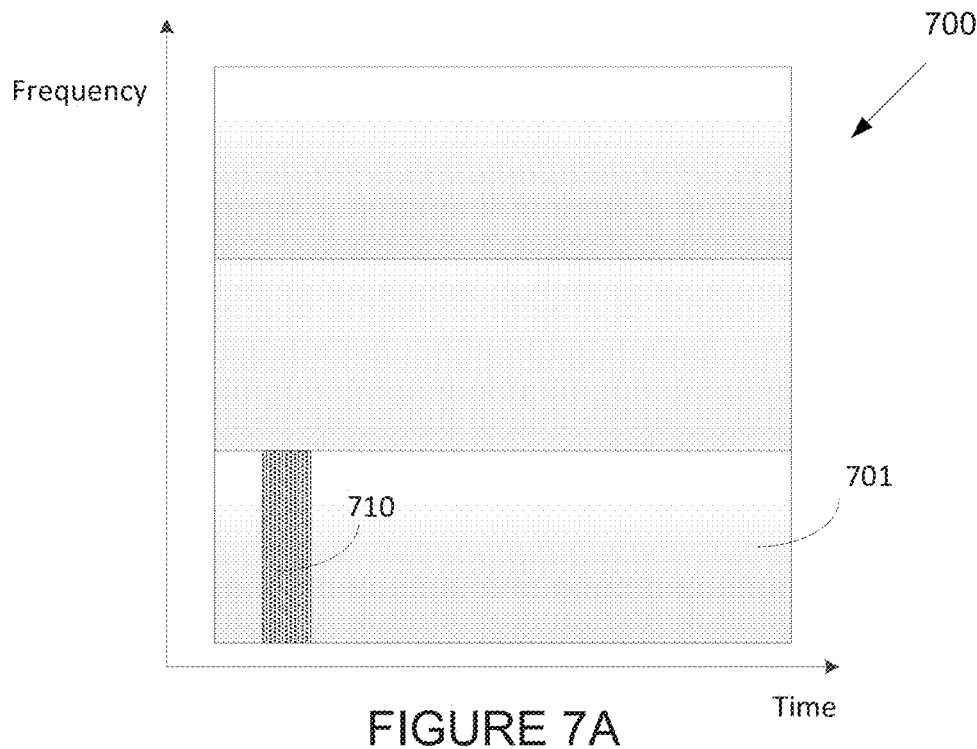
FIG. 7A illustrates an example RS mapping configuration 1 according to embodiments of the present disclosure.

FIG. 7A illustrates an example RS mapping configuration 1 700 according to embodiments of the present disclosure. An embodiment of the RS mapping configuration 1 700 shown in FIG. 7A is for illustration only. Other embodiments may be used without departing from the scope of the present disclosure.

Figure 7B:
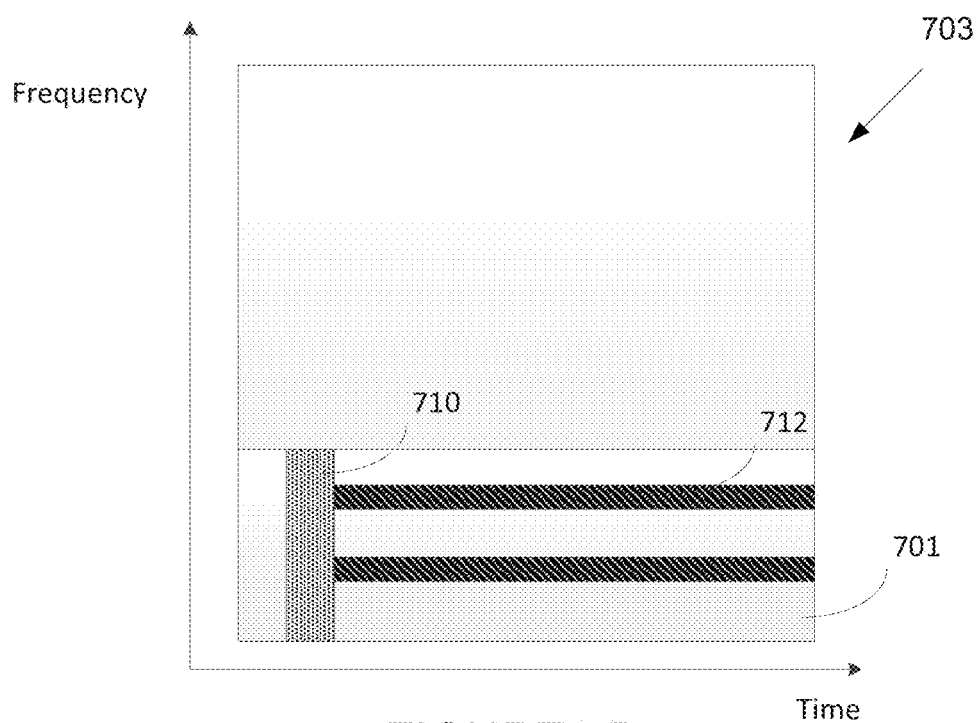
FIG. 7B illustrates an example RS mapping configuration 2 according to embodiments of the present disclosure.

FIG. 7B illustrates an example RS mapping configuration 2 703 according to embodiments of the present disclosure. An embodiment of the RS mapping configuration 2 703 shown in FIG. 7B is for illustration only. Other embodiments may be used without departing from the scope of the present disclosure.

Figure 7C:
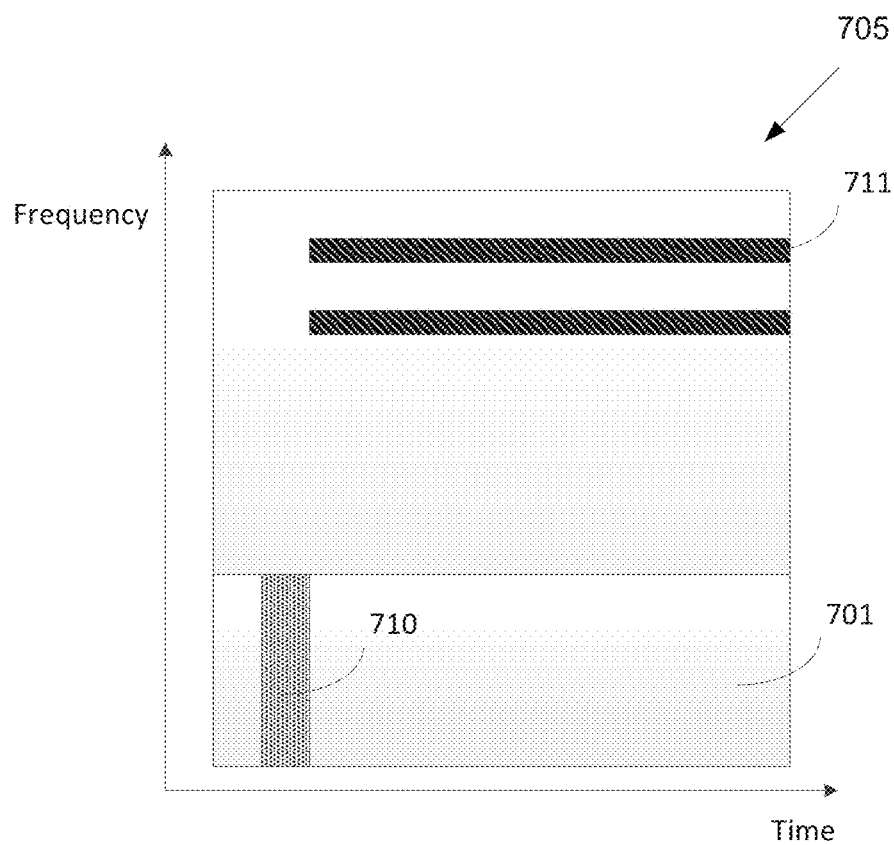
FIG. 7C illustrates an example RS mapping configuration 3 according to embodiments of the present disclosure.

FIG. 7C illustrates an example RS mapping configuration 3 705 according to embodiments of the present disclosure. An embodiment of the RS mapping configuration 3 705 shown in FIG. 7C is for illustration only. Other embodiments may be used without departing from the scope of the present disclosure.

In some embodiments, for channel estimation and phase noise tracking/estimation for PDSCH demodulation on an antenna port, a UE is configured in a higher layer, with one of the following RS mapping configurations. In one example of a configuration 1 illustrated in FIG. 7A, the UE uses RS 710 mapped according to the first RS mapping pattern on the scheduled BW 701. In this configuration 1, the phase-noise reference signal component is absent in the scheduled PDSCH. This configuration 1 is useful when phase noise errors are negligible. In another example of configuration 2 illustrated in FIG. 7B, the UE may use RS 710 and 712 mapped according to the aggregation of the first and the second RS mapping patterns on the scheduled BW 701. This configuration 2 is useful when phase noise errors are both Tx and Rx dominant or Tx dominant, in which case a UE-specific reference signal should be used for estimation of phase noise errors for each PDSCH. In yet another example of configuration illustrated in FIG. 7C, the UE may use: (1) the RS 710 (e.g., first RS) mapped according to the first RS mapping pattern on the scheduled BW 701; and (2) a RS 711 (e.g., second RS) mapped according to the second RS mapping pattern on a separate BW.

An eNB may configure the second RS to be used by a group of UEs; a UE can be informed in a higher layer (e.g., radio resource control (RRC)) of the separate BW, e.g., in terms of identities of time-frequency resource units (e.g., PRBs). This configuration is useful when the phase noise errors are Rx dominant, in which case a common RS can be used for estimation of such phase noise errors at a group of scheduled UEs in a subframe.

In some embodiments, the UE is configured in the higher layer (e.g., RRC) of an information on whether the UE can be provided with phase-noise reference signal (according to the second RS mapping pattern) or not for channel estimation and PDSCH demodulation.

In some embodiments, the UE is dynamically indicated whether the UE is provided with phase-noise reference signal for the channel estimation and demodulation of one given scheduled PDSCH.

The higher-layer configuration can be indicated explicitly through higher layer message or implicitly by carrier frequency to a UE. The dynamic signaling is only enabled when the UE is configured such that the UE can be provided with phase noise reference signal. The information provided in the dynamic signaling can be explicitly indicated via a codepoint in a DCI scheduling the PDSCH for the UE or implicitly via the modulation and coding scheme (MCS) level in the PDSCH for the UE.

When a UE is configured such that the UE can be provided with phase noise reference signal, in one embodiment, the dynamic signaling indicates an RS mapping configuration out of the three RS mapping configurations devised in FIGS. 7A, 7B, and 7C for demodulation of the scheduled PDSCH via a state of a codepoint in the DCI. In one example, the dynamic signaling comprises a one bit codepoint on a DCI on a PDCCH. When the state of the 1-bit codepoint equals to 0, the UE is configured to use DMRS generated according to the first configuration (with the first RS mapping pattern only).

When the state of the 1-bit codepoint equals to 1, the UE is configured to use RS mapped according to an aggregation of the first and the second RS mapping patterns (corresponding to Configurations 2 illustrated in FIGS. 7B and 3 illustrated in FIG. 7C). In one embodiment, a UE is configured to use Configuration 2. In another embodiment, a UE is configured to use Configuration 3. In yet another embodiment, a UE is configured in the higher layer, which of Configuration 2 and Configuration 3 may be used in this case.

The RS mapping configuration information can be implicitly indicated by the MCS used/indicated for the scheduled PDSCH in the DCI. In one embodiment, the two cases of the MCS being lower and greater than or equal to an MCS threshold respectively correspond to "state 0" and "state 1" in the above example. In another embodiment, the two cases of the modulation order being lower and greater than or equal to a modulation order threshold (the threshold can be e.g., 4 or 6) respectively correspond to "state 0" and "state 1" in the above example. Similar embodiment can be constructed with the transmission schemes of PDSCH allocation, the number of spatial multiplexing layers of PDSCH allocation, the HARQ redundancy version of PDSCH allocation and combinations thereof.

When the UE is configured such that the UE is not provided with the phase noise reference signals, the codepoint does not exist in the DCI or the UE can assume to ignore the codepoint field in the DCI, and the UE is configured to receive RS according to configuration 1 (i.e., only a first reference signal pattern is mapped on the scheduled PDSCH).

In one embodiment, carrier frequency and a higher layer configuration are used to indicate an RS mapping configuration. If the carrier frequency is less than a first carrier frequency threshold, the UE is configured with an RS mapping configuration 1. If the carrier frequency is greater than or equal to a first carrier frequency threshold, the UE is configured to detect 1 bit in information (in RRC or SIB) and this 1 bit indicates the candidate RS mapping configurations, for example either {configurations 1 or 2} or {configurations 1, 3}. The selected RS mapping configuration out of the two candidates for each scheduled PDSCH can be dynamically indicated according to some embodiments of the present disclosure.

In another embodiment, if the carrier frequency is below a first carrier frequency threshold, the first reference signal pattern is used (Configuration 1) and the DCI does not contain information on the RS mapping configuration. If the carrier frequency is above or equal to a first carrier frequency threshold, the UE is configured to check the state of a codepoint of a DCI scheduling for the PDSCH or to figure out the RS mapping configuration according to some embodiments of the present disclosure.

Figure 8:
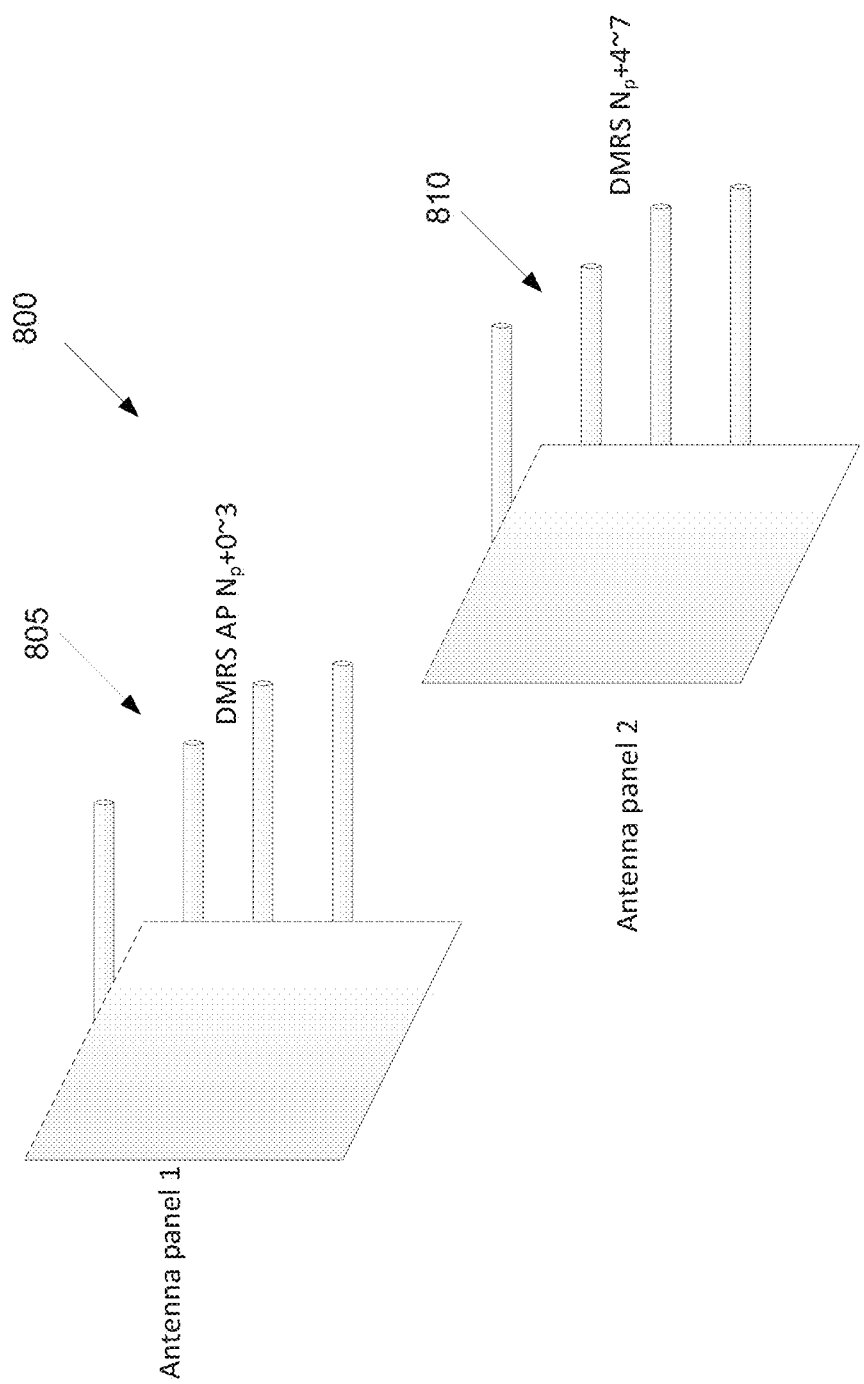
FIG. 8 illustrates an example base station (BS) antenna panels according to embodiments of the present disclosure.

FIG. 8 illustrates example base station (BS) antenna panels 800 according to embodiments of the present disclosure. An embodiment of the BS antenna panels 800 shown in FIG. 8 is for illustration only. Other embodiments may be used without departing from the scope of the present disclosure.

As shown in FIG. 8, the BS antenna panels 800 correspond to DMRS APs allocated to the panels. The BS comprises an Npanel (e.g., 2 in this illustration) number of antenna panels, wherein each panel comprises an NTXRUs (e.g., 4 in this illustration) number of TXRUs, each TXRU mapping to a DMRS AP. In this example, the first four DMRS antenna ports {Np+0, Np+1, Np+2, Np+3} 805 are mapped to antenna panel 1 and the second four DMRS antenna ports {Np+4, Np+5, Np+6, Np+7} 810 are mapped to antenna panel 2.

The RS for channel estimation (e.g., mapped according to the first RS mapping pattern) needs to be provided per AP. However, it is not always necessary to provide RS for phase noise estimation (e.g., mapped according to the second RS mapping pattern) per AP. For example, one-port phase-noise RS may be sufficient for UE's demodulation of data on DMRS APs on the same panel. The aim of embodiments is to allow the BS to flexibility configure a mapping between phase noise reference signal antenna port and DMRS antenna ports for different implementation and deployment scenarios. In such embodiments, the UE may use a certain phase-noise RS AP for demodulating data on a given DMRS AP. In one example, one phase noise RS AP is configured to be used for demodulating data on each DMRS antenna port—one-to-one mapping. In another example, one phase noise RS AP is configured to be used for demodulating data on multiple DMRS antenna ports—one-to-many mapping.

In some embodiments, the $N_1$ number of antenna ports for the RS for channel estimation and the $N_2$ number of antenna ports for RS for phase-noise estimation are separately configured. In one example, $N_1=8$, and $N_2=2$, and: APs for RS for channel estimation $\{N_p+0, N_p+1, N_p+2, N_p+3, N_p+4, N_p+5, N_p+6, N_p+7\}$; and APs for RS for phase-noise estimation $\{N_q+0, N_q+1\}$.

The UE can use a first AP ($N_q+0$) for RS for phase-noise estimation for demodulating data on the first four DMRS APs $\{N_p+0, N_p+1, N_p+2, N_p+3\}$ and a second AP ($N_q+1$) for RS for phase-noise estimation for demodulating data on the second four DMRS APs $\{N_p+4, N_p+5, N_p+6, N_p+7\}$.

In some embodiments, the N number of antenna ports are configured for channel estimation and for phase-noise estimation. In one example, in the system with antenna configuration shown in FIG. 8, the UE can receive data on up to 8 antenna ports $\{N_p+0, N_p+1, N_p+2, N_p+3, N_p+4, N_p+5, N_p+6, N_p+7\}$, for each of which RS is provided according to RS mapping configuration 2—mapped according to an aggregation of RS mapping patterns 1 and 2 in the scheduled BW.

In some embodiments, the UE is configured to use a particular phase-noise RS AP for demodulating data on a DMRS AP. The phase noise RS port q configured to be used for data demodulation on DMRS port p is derived by the equation given by:

$$q = \left\lfloor \frac{p - N_p}{N_{pnrs}} \right\rfloor + N_q$$

where q is the phase noise RS AP number, p is the DMRS AP number, $N_p$ and $N_q$ are the antenna port number offset for phase noise reference signal and DMRS, respectively. The $N_{pnrs}$ mapping parameter is configured by the BS through higher layer signaling (e.g., RRC).

In one example, the DMRS antenna port numbers are {10, 11, 12, ..., 17} and $N_p=10$ and $N_q=100$. The BS signals $N_{pnrs}=4$ to the UE. The UE is configured to calculate the antenna port mapping based on the above equation and configuration received from the BS. The UE may include the phase noise reference signal antenna port 100 mapping to DMRS antenna {10, 11, 12, 13} and the phase noise reference signal antenna port 101 mapping to DMRS antenna port {14, 15, 16, 17}. The UE may use the phase noise error estimated from phase noise reference signal antenna port 100 to compensate the DMRS antenna port {10, 11, 12, 13} and the UE is configured to use the phase noise error estimated from phase noise reference signal antenna port 101 to compensate the DMRS antenna port {14, 15, 16, 17}.

In some embodiments, the phase noise reference signal component in reference signal may have various time and frequency density. In one example, the time domain density may be every one, two or four OFDM symbols and frequency domain density is every 48 subcarriers. Different time domain density may allow different phase variation limitation. The density configuration of reference signal component for phase noise estimation can be signaled explicitly through a few bits in DCI scheduling a PDSCH/PUSCH or in an RRC signaling configuring a PDSCH/PUSCH transmission. In one example, four preconfigured time domain/frequency domain density of phase noise estimation component is defined and a first 2-bit field in RRC signaling to indicate one out of four preconfigured density structures to a UE.

Figure 9:
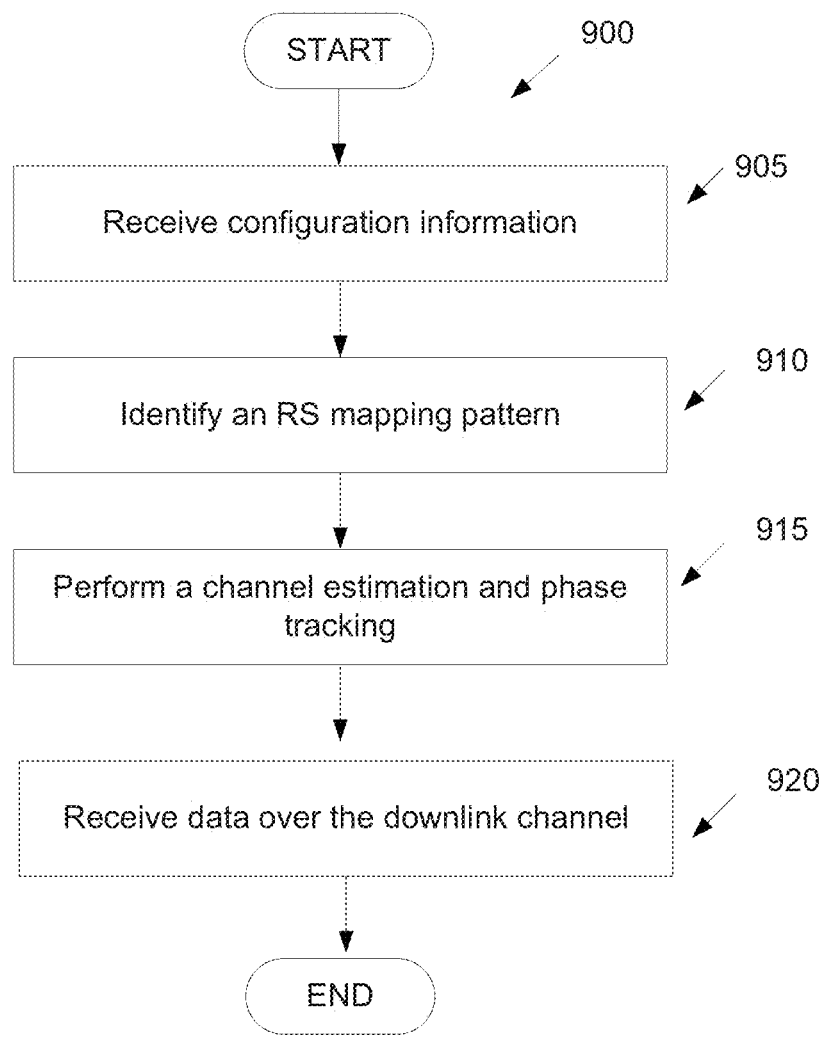
FIG. 9 illustrates a process for controlling RS according to embodiments of the present disclosure.

FIG. 9 illustrates a process 900 for controlling RS according to embodiments of the present disclosure, as may be performed by a UE. An embodiment of the process 900 shown in FIG. 9 is for illustration only. Other embodiments may be used without departing from the scope of the present disclosure.

The process 900 for controlling RS begins with the UE 116. The UE 116 receives, in step 905, configuration information of the phase noise RS using a radio resource control (RRC) signal and downlink control information (DCI) through a hybrid signaling scheme.

In some embodiments, the RRC signal includes information indicating whether the phase noise RS for the phase tracking is included for a downlink channel and an uplink channel in the scheduled BW, respectively. In some embodiments, the DCI includes a modulation and coding scheme (MCS) to identify whether the phase noise RS is included in a scheduled downlink allocation or a scheduled uplink allocation, and the RS mapping pattern when the phase noise RS for the phase tracking is included in the scheduled downlink allocation and the scheduled uplink allocation over the scheduled BW, respectively.

In some embodiments, the DCI further comprises a code point indicating whether a scheduled downlink allocation and a scheduled uplink allocation in the scheduled BW includes the phase noise RS, respectively. In some embodiments, the DCI further comprises a code point indicating at least one frequency and time density pattern that is used for a scheduled downlink allocation and a scheduled uplink allocation included in the scheduled BW.

The UE 116 subsequently identifies, in step 910, the RS mapping pattern based on the configuration information of the phase noise RS signaled in the RRC and the DCI in step 905 through the hybrid signaling scheme.

In some embodiments, the UE 116 further identifies, in step 910, demodulation reference signal (DMRS) antenna ports corresponding to phase noise RS antenna ports and apply, to a channel, a phase rotation estimated from the phase noise RS. In such embodiments, the channel is estimated from the DMRS antenna ports and a number of phase tracking RS antenna ports is less than a number of the DMRS antenna ports in the scheduled BW.

The UE 116 subsequently performs, in step 915, a channel estimation and phase tracking for a downlink channel in the scheduled BW according to the identified RS mapping pattern. In some embodiments, the UE 116 further performs, in step 915, the channel estimation and phase tracking for an uplink channel in the scheduled BW according to the identified RS mapping pattern.

The UE finally receives, in step 920, data over the downlink channel in the scheduled BW from the eNB. In some embodiments, the UE is further configured to transmit, to the BS, uplink data over the uplink channel in the scheduled BW.

Figure 10:
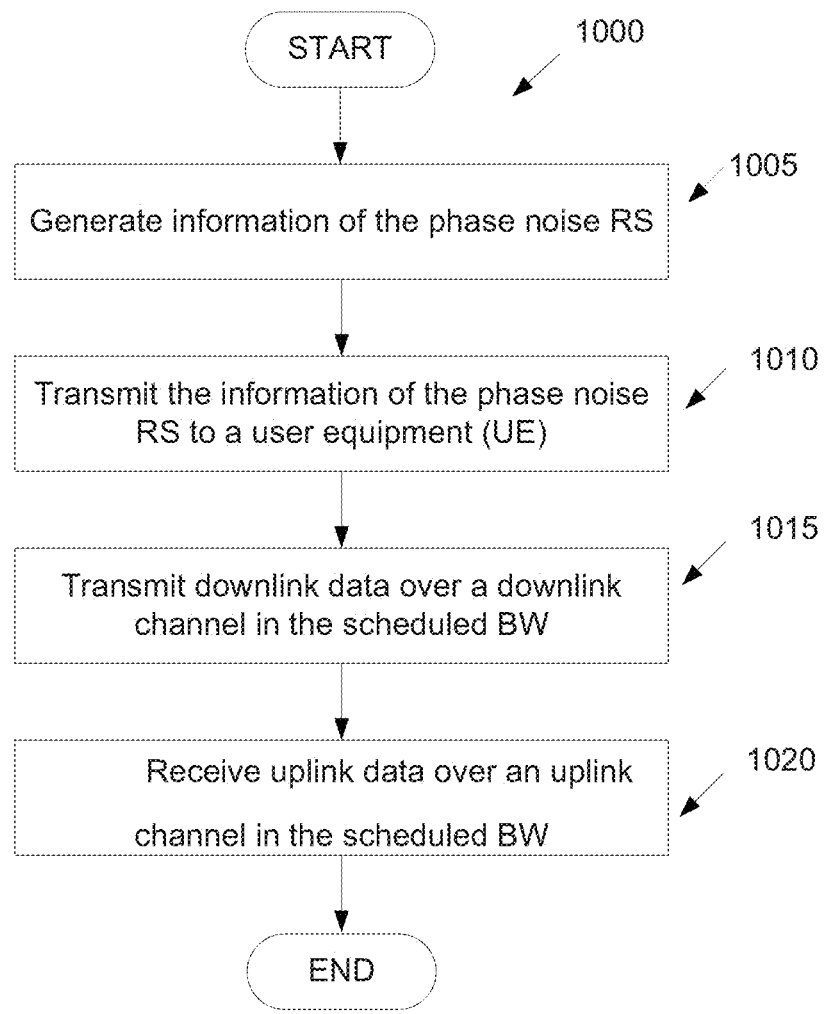
FIG. 10 illustrates another process for controlling RS according to embodiments of the present disclosure.

FIG. 10 illustrates another process 1000 for controlling reference signal according to embodiments of the present disclosure, as may be performed by an base station (BS). An embodiment of the process 1000 shown in FIG. 10 is for illustration only. Other embodiments may be used without departing from the scope of the present disclosure.

The process 1000 for controlling RS begins with the base station (BS) 102. In step 1005, the BS generates information of the phase noise RS including an RS mapping pattern that is used, at a user equipment (UE), for a channel estimation and phase tracking for a downlink channel in a scheduled bandwidth (BW). Subsequently, the BS transmits, in step 1010, the information of the phase noise RS using a radio resource control (RRC) signal and downlink control information (DCI) through a hybrid signaling scheme.

In some embodiments, the RRC signal includes information indicating whether the phase noise RS for the phase tracking is included for the downlink channel and the uplink channel in the scheduled BW, respectively. In some embodiments, the DCI includes a modulation and coding scheme to identify the RS mapping pattern when the phase noise RS for the phase tracking is included for a scheduled downlink allocation and a scheduled uplink allocation in the scheduled BW, respectively. In some embodiments, the DCI comprises a code point indicating whether a scheduled downlink allocation and a scheduled uplink allocation in the scheduled BW includes the phase noise RS, respectively and a code point indicating at least one density pattern that is used for a scheduled downlink allocation and a scheduled uplink allocation included in the scheduled BW.

Subsequently, the BS transmits, in step 1015, downlink data over a downlink channel in the scheduled BW to the UE. Finally, the BS receives, in step 1020, uplink date over an uplink channel in the scheduled BW from the UE.

A first time domain/frequency domain density configuration can be used for UE with small phase noise variation. A second time domain/frequency domain density configuration can be used for UE with large phase noise. A third and a fourth time domain/frequency domain density configuration can be used for UE who is capable to compensate the inter-subcarrier interference caused by phase noise.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. An apparatus for a user equipment (UE) in a wireless communication system, the apparatus comprising:
   a transceiver, wherein the transceiver is configured to:
      receive, from a base station (BS), configuration information for a phase-tracking reference signal (RS) based on a radio resource control (RRC) signaling, and receive, from the base station, downlink control information (DCI) for a physical downlink shared channel (PDSCH); and at least one processor, wherein the at least one processor is configured to identify a presence and a pattern of the phase-tracking RS based on the configuration information and a modulation and coding scheme (MCS) in the DCI, wherein the pattern of the phase-tracking RS is associated with a time density of the phase-tracking RS, and wherein the presence and the pattern of the phase-tracking RS is identified based on a comparison of the MCS in the DCI with an MCS threshold, wherein the transceiver is configured to receive, from the base station, the phase-tracking RS based on the presence and the pattern of the phase-tracking RS.

2. The apparatus of claim 1, wherein the pattern of the phase-tracking RS is associated with the time density of the phase-tracking RS and a frequency density of the phase-tracking RS, wherein a unit of the time density of the phase-tracking RS is one symbol, two symbols, or four symbols in a time domain, and wherein a unit of the frequency density of the phase-tracking RS is one or more physical resource blocks in a frequency domain.

3. The apparatus of claim 2, wherein the configuration information includes at least one of first information for identifying the time density of the phase-tracking RS or second information for identifying the frequency density of the phase-tracking RS.

4. The apparatus of claim 3, wherein at least one of the time density of the phase-tracking RS or the frequency density of the phase-tracking RS is identified among predefined values based on at least one of the first information or the second information.

5. The apparatus of claim 1, wherein an antenna port for the phase-tracking RS is associated with at least one antenna port for a demodulation reference signal (DM-RS) configured for the PDSCH.

6. The apparatus of claim 1, wherein the transceiver is further configured to receive, from the base station, a demodulation reference signal (DM-RS) according to a pattern of the DM-RS, based upon determining that the phase-tracking RS is absent, and wherein the at least one processor is further configured to perform channel estimation and demodulation for the PDSCH by using the DM-RS without the phase-tracking RS.

7. An apparatus for a base station (BS) in a wireless communication system, the apparatus comprising:

a transceiver configured to:
transmit, to a user equipment (UE), configuration information for a phase-tracking reference signal (RS) based on a radio resource control (RRC) signaling, wherein a presence and a pattern of the phase-tracking RS is identified based on a comparison of a modulation and coding scheme (MCS) in a downlink control information (DCI) with an MCS threshold,
transmit, to the UE, the DCI for a physical downlink shared channel (PDSCH), and
transmit the phase-tracking RS based on the presence and the pattern of the phase-tracking RS; and at least one processor, wherein the at least one processor is configured to indicate the presence and the pattern of the phase-tracking RS is indicated based on the configuration information and a modulation and coding scheme (MCS) in the DCI, and wherein the pattern of the phase-tracking RS is associated with a time density of the phase-tracking RS.

8. The apparatus of claim 7, wherein the pattern of the phase-tracking RS is associated with the time density of the phase-tracking RS and a frequency density of the phase-tracking RS, wherein a unit of the time density of the phase-tracking RS is one symbol, two symbols, or four symbols in a time domain, and wherein a unit of the frequency density of the phase-tracking RS is one or more physical resource blocks in a frequency domain.

9. The apparatus of claim 8, wherein the configuration information includes at least one of first information for identifying the time density of the phase-tracking RS or second information for identifying the frequency density of the phase-tracking RS.

10. The apparatus of claim 7, wherein an antenna port for the phase-tracking RS is associated with at least one antenna port for a demodulation reference signal (DM-RS).

11. A method performed by a user equipment (UE) in a wireless communication system, the method comprising:

receiving, from a base station (BS), configuration information for a phase-tracking reference signal (RS) based on a radio resource control (RRC) signaling;

receiving, from the base station, downlink control information (DCI) for a physical downlink shared channel (PDSCH);

identifying a presence and a pattern of the phase-tracking RS based on the configuration information and a modulation and coding scheme (MCS) in the DCI, wherein the pattern of the phase-tracking RS is associated with a time density of the phase-tracking RS, and wherein the presence and the pattern of the phase-tracking RS is identified based on a comparison of the MCS in the DCI with an MCS threshold; and receiving, from the BS, the phase-tracking RS based on the presence and the pattern of the phase-tracking RS.

12. The method of claim 11, wherein the pattern of the phase-tracking RS is associated with the time density of the phase-tracking RS and a frequency density of the phase-tracking RS, wherein a unit of the time density of the phase-tracking RS is one symbol, two symbols, or four symbols in a time domain, and wherein a unit of the frequency density of the phase-tracking RS is one or more physical resource blocks in a frequency domain.

13. The method of claim 12, wherein the configuration information includes at least one of first information for identifying the time density of the phase-tracking RS or second information for identifying the frequency density of the phase-tracking RS.

14. The method of claim 11, wherein an antenna port for the phase-tracking RS is associated with at least one antenna port for a demodulation reference signal (DMRS) configured for the PDSCH.

15. The method of claim 11, further comprising:
receiving, from the BS, a demodulation reference signal (DM-RS) according to a pattern of the DM-RS, based upon determining that the phase-tracking RS is absent; and
performing a channel estimation and a demodulation for the PDSCH by using the DM-RS without the phase-tracking RS.

16. A method performed by a user equipment (UE), the method comprising:

receiving, from a base station, uplink configuration information for an uplink phase-tracking reference signal (RS) based on a radio resource control (RRC) signaling;

receiving, from the base station, downlink control information (DCI) for a physical uplink shared channel (PUSCH);

identifying a presence and a pattern of the uplink phase-tracking RS based on the uplink configuration information and a modulation and coding scheme (MCS) in the DCI, wherein the pattern of the uplink phase-tracking RS is associated with a time density of the uplink phase-tracking RS, and wherein the presence and the pattern of the phase-tracking RS is identified based on a comparison of the MCS in the DCI with an MCS threshold; and transmitting, to the base station, the uplink phase-tracking RS based on the presence and the pattern of the uplink phase-tracking RS.

17. An apparatus for a user equipment (UE) in a wireless communication system, the apparatus comprising:

a transceiver, wherein the transceiver is configured to:
receive, from a base station, uplink configuration information for an uplink phase-tracking reference signal (RS) based on a radio resource control (RRC) signaling, and
receive, from the base station, downlink control information (DCI) for a physical uplink shared channel (PUSCH); and, at least one processor configured to identify a presence and a pattern of the uplink phase-tracking RS based on the configuration information and a modulation and coding scheme (MCS) in the DCI, wherein the pattern of the phase-tracking RS is associated with a time density of the phase-tracking RS, wherein the presence and the pattern of the phase-tracking RS is identified based on a comparison of the MCS in the DCI with an MCS threshold, and wherein the transceiver is configured to transmit, to the base station, the uplink phase-tracking RS based on the presence and the pattern of the phase-tracking RS.

18. The apparatus of claim 7, wherein the transceiver is further configured to transmit, to the UE, a demodulation reference signal (DM-RS) according to a pattern of the DM-RS, based upon identifying that the phase-tracking RS is absent, and wherein the at least one processor is configured to perform channel estimation and demodulation for the PDSCH are performed by the UE by using the DM-RS without the phase-tracking RS.

19. An apparatus for a base station (BS) in a wireless communication system, the apparatus comprising:

a transceiver, wherein the transceiver is configured to:
transmit, to a user equipment (UE), uplink configuration information for an uplink phase-tracking RS based on a radio resource control (RRC) signaling,
transmit, to the UE, downlink control information (DCI) for a physical downlink shared channel (PDSCH), and
receive, from the UE, the uplink phase-tracking RS based on a presence and a pattern of the uplink phase-tracking RS; and at least one processor, wherein the at least one processor is configured to identifying a presence and a pattern of the uplink phase-tracking RS based on the uplink configuration information and a modulation and coding scheme (MCS) in the DCI, wherein the pattern of the uplink phase-tracking RS is associated with a time density of the uplink phase-tracking RS, and wherein the presence and the pattern of the phase-tracking RS is identified based on a comparison of the MCS in the DCI with an MCS threshold.

20. A method performed by a base station in a wireless communication system, the method comprising:

transmitting, to a user equipment (UE), configuration information for a phase-tracking reference signal (RS) associated with a radio resource control (RRC) signaling;

transmitting, to the UE, downlink control information (DCI) for a physical downlink shared channel (PDSCH), wherein a presence and a pattern of the phase-tracking RS is indicated based on the configuration information and a modulation and coding scheme (MCS) in the DCI; and transmitting the phase-tracking RS based on the presence and the pattern of the phase-tracking RS, wherein the pattern of the phase-tracking RS is associated with a time density of the phase-tracking RS, and wherein the presence and the pattern of the phase-tracking RS is identified based on a comparison of the MCS in the DCI with an MCS threshold.

21. The method of claim 20, wherein the pattern of the phase-tracking RS is associated with the time density of the phase-tracking RS and a frequency density of the phase-tracking RS, wherein a unit of the time density of the phase-tracking RS is one symbol, two symbols, or four symbols in a time domain, and wherein a unit of the frequency density of the phase-tracking RS is one or more physical resource blocks in a frequency domain.

22. The method of claim 21, wherein the configuration information includes at least one of first information for identifying the time density of the phase-tracking RS or second information for identifying the frequency density of the phase-tracking RS.

23. The method of claim 20, wherein an antenna port for the phase-tracking RS is associated with at least one antenna port for a demodulation reference signal (DM-RS).

24. The method of claim 20, further comprising:
transmitting, to the UE, a demodulation reference signal (DM-RS) according to a pattern of the DM-RS, based upon determining that the phase-tracking RS is absent from the PDSCH, wherein channel estimation and the demodulation for the PDSCH are performed by the UE, by using the DM-RS without the phase-tracking RS.

25. A method performed by a base station in a wireless communication system, the method comprising:

transmitting, to a user equipment (UE), uplink configuration information for an uplink phase-tracking reference signal (RS) based on a radio resource control (RRC) signaling;

transmitting, to the UE, downlink control information (DCI) for a physical uplink shared channel (PUSCH), wherein a presence and a pattern of the uplink phase-tracking RS is indicated based on the uplink configuration information and a modulation and coding scheme, MCS, in the DCI; and receiving, from the UE, the uplink phase-tracking RS based on the presence and the pattern of the uplink phase-tracking RS, wherein the pattern of the uplink phase-tracking RS is associated with a time density of the uplink phase-tracking RS, and wherein the presence and the pattern of the phase-tracking RS is identified based on a comparison of the MCS in the DCI with an MCS threshold.

\* \* \* \* \*